United States Patent
Kim et al.

(10) Patent No.: US 11,412,453 B2
(45) Date of Patent: Aug. 9, 2022

(54) APPARATUS AND METHOD FOR CONTROLLING TIME PERIOD RELATED TO OPERATING MODE IN WIRELESS COMMUNICATION SYSTEM

(71) Applicant: Samsung Electronics Co., Ltd., Suwon-si (KR)

(72) Inventors: Young-Jin Kim, Hwaseong-si (KR); Changsung Lee, Anyang-si (KR); Suwon Lee, Suwon-si (KR); Jinguk Jeong, Yongin-si (KR); Hee-Kwun Cho, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 130 days.

(21) Appl. No.: 16/620,243

(22) PCT Filed: Jun. 1, 2018

(86) PCT No.: PCT/KR2018/006284
§ 371 (c)(1),
(2) Date: Dec. 6, 2019

(87) PCT Pub. No.: WO2018/225990
PCT Pub. Date: Dec. 13, 2018

(65) Prior Publication Data
US 2021/0084594 A1  Mar. 18, 2021

(30) Foreign Application Priority Data
Jun. 8, 2017  (KR) .................. 10-2017-0071629

(51) Int. Cl.
*H04W 52/02* (2009.01)
*G06F 1/3212* (2019.01)

(52) U.S. Cl.
CPC ...... *H04W 52/0261* (2013.01); *G06F 1/3212* (2013.01); *H04W 52/0212* (2013.01)

(58) Field of Classification Search
CPC ......... H04W 52/0261; H04W 52/0212; H04W 52/02; H04W 88/18; G06F 1/3212; G06F 1/3278; Y02D 30/70; Y02D 10/00
(Continued)

(56) References Cited

U.S. PATENT DOCUMENTS

2012/0315960 A1   12/2012  Kim
2013/0231894 A1*   9/2013  Paakkonen ........... H02J 7/0071
                                                   702/183
(Continued)

FOREIGN PATENT DOCUMENTS

JP     2013-201508 A    10/2013
KR  10-2004-0103186 A   12/2004
(Continued)

OTHER PUBLICATIONS

Korean Office Action dated Jun. 19, 2021, issued in a counterpart Korean Application No. 10-2017-0071629.
(Continued)

*Primary Examiner* — Michael Y Mapa
(74) *Attorney, Agent, or Firm* — Jefferson IP Law, LLP

(57) ABSTRACT

An operating method of a server in a wireless communication system comprises the steps of: receiving, from an electronic device, information on a battery state of the electronic device and information on a time period related to an operating mode of the electronic device; determining a time interval for minimizing battery consumption of the electronic device on the basis of the information on the battery state and the information on the time period; and transmitting information on the time interval for minimizing the battery consumption of the electronic device.

12 Claims, 11 Drawing Sheets

(58) Field of Classification Search
USPC ......... 370/311; 455/343.1–343.2, 343.5, 574
See application file for complete search history.

(56) References Cited

U.S. PATENT DOCUMENTS

| | | | |
|---|---|---|---|
| 2014/0095091 A1* | 4/2014 | Moore | G01R 31/371 |
| | | | 702/63 |
| 2015/0077127 A1 | 3/2015 | Fu et al. | |
| 2016/0205622 A1 | 7/2016 | Ronneke et al. | |
| 2017/0164288 A1* | 6/2017 | Iwai | H04W 68/005 |
| 2020/0022216 A1* | 1/2020 | Huang | H04W 76/30 |

FOREIGN PATENT DOCUMENTS

| | | |
|---|---|---|
| KR | 10-2005-0031332 A | 4/2005 |
| KR | 10-1531069 B1 | 10/2011 |

OTHER PUBLICATIONS

Extended European Search Report dated May 28, 2020, issued in a counterpart European Application No. 18812725.2-1205 / 3637868.

\* cited by examiner

APPARATUS AND METHOD FOR CONTROLLING TIME PERIOD RELATED TO OPERATING MODE IN WIRELESS COMMUNICATION SYSTEM

CROSS-REFERENCE TO RELATED APPLICATION(S)

This application is a U.S. National Stage application under 35 U.S.C. § 371 of an International application number PCT/KR2018/006284, filed on Jun. 1, 2018, which is based on and claimed priority of a Korean patent application number 10-2017-0071629, filed on Jun. 8, 2017, in the Korean Intellectual Property Office, the disclosure of which is incorporated by reference herein in its entirety.

BACKGROUND ART

The disclosure generally relates to a wireless communication system and, more particularly, to an apparatus and method for controlling a time duration related to an operation mode in a wireless communication system.

The Internet is evolving from a human-oriented connection network, in which humans generate and consume information, to the internet of things (IoT), in which distributed elements, such as objects and the like, exchange and process information. internet-of-everything (IoE) technology, in which big-data processing technology is combined with the IoT technology through connection via a cloud server or the like, has emerged. In order to implement the IoT, technical factors such as a sensing technique, wired/wireless communication, network infrastructure, service-interface technology, and security technology are required, and research on technologies such as a sensor network, Machine-to-Machine (M2M) communication, Machine-Type Communication (MTC), and the like for connection between objects has recently been conducted.

In an IoT environment, through collection and analysis of data generated in connected objects, an intelligent Internet Technology (IT) service to create new value for peoples' lives may be provided. The IoT may be applied to fields such as those of a smart home, a smart building, a smart city, a smart car, a connected car, a smart grid, health care, a smart home appliance, or high-tech medical services through the convergence of conventional Information Technology (IT) and various industries.

DETAILED DESCRIPTION OF THE INVENTION

Technical Problem

Based on the above discussion, the disclosure provides an apparatus and method for controlling a time duration related to an operation mode of an electronic device in a wireless communication system.

Further, the disclosure provides an apparatus and method for determination of a time duration for minimizing battery consumption by an electronic device in a wireless communication system.

Furthermore, the disclosure provides an apparatus and method for displaying a notification of battery availability of an electronic device in a wireless communication system.

Technical Solution

An operation method of a server in a wireless communication system according to various embodiments of the disclosure includes: receiving, from an electronic device, information on a battery state of the electronic device and information on a time duration related to an operation mode of the electronic device; determining a time duration for minimizing battery consumption by the electronic device based on the information on the battery state and the information on the time duration; and transmitting information on the time duration for minimizing the battery consumption by the electronic device.

An operation method of a server in a wireless communication system according to various embodiments of the disclosure includes: receiving, from another sever, information on a usable battery life of an electronic device; and displaying information indicating that the battery of the electronic device is usable based on the information on the usable battery life of the electronic device.

A server device in a wireless communication system according to various embodiments of the disclosure includes: a transceiver configured to receive, from an electronic device, information on a battery state of the electronic device and information on a time duration related to an operation mode of the electronic device; and a controller configured to determine a time duration for minimizing battery consumption by the electronic device based on the information on the battery state and the information on the time duration, wherein the transceiver transmits information on the time duration for minimizing the battery consumption by the electronic device.

A server device in a wireless communication system according to various embodiments of the disclosure includes: a transceiver configured to receive, from another server, information on a usable battery life of an electronic device; and a display unit configured to indicate that the battery of the electronic device is usable based on the information on the usable battery life of the electronic device.

Advantageous Effects

An apparatus and method according to various embodiments of the disclosure may minimize power consumption by an IoT device by controlling a time duration related to an operation mode of an Internet of Things (IoT) device.

The effects that can be acquired by the disclosure are not limited to the above described effects, and other effects that have not been mentioned may be clearly understood by those skilled in the art from the following description.

MODE FOR CARRYING OUT THE INVENTION

The terms used in the disclosure are only used to describe specific embodiments, and are not intended to limit the disclosure. A singular expression may include a plural expression unless they are definitely different in context. Unless defined otherwise, all terms used herein, including technical and scientific terms, have the same meanings as those commonly understood by a person skilled in the art to which the disclosure pertains. Terms defined in a generally used dictionary may be interpreted to have the meanings equal to the contextual meanings in the relevant field of art, and are not to be interpreted to have ideal or excessively formal meanings unless clearly defined in the disclosure. In some cases, even terms defined in the disclosure should not be interpreted to exclude embodiments of the disclosure.

Hereinafter, various embodiments of the disclosure will be described based on a hardware approach. However, various embodiments of the disclosure include a technology that uses both hardware and software and thus, the various embodiments of the disclosure may not exclude the perspective of software.

The disclosure relates to an apparatus and method for controlling interference between services in a wireless communication system.

Terms referring to a time duration related to an operation mode of an Internet of Things (IoT) device 110 (e.g., terms referring to an extended discontinuous reception (eDRX) duration, an active duration, a sleep duration, and a power saving mode (PSM) duration), terms referring to control information, terms referring to network entities, terms referring to messages, terms referring to elements of a device, and the like, which are used in the disclosure, are described as an example for the convenience of explanation. Accordingly, the disclosure is not limited to the terms, and other terms having the same technical meaning may be used.

Figure 1:
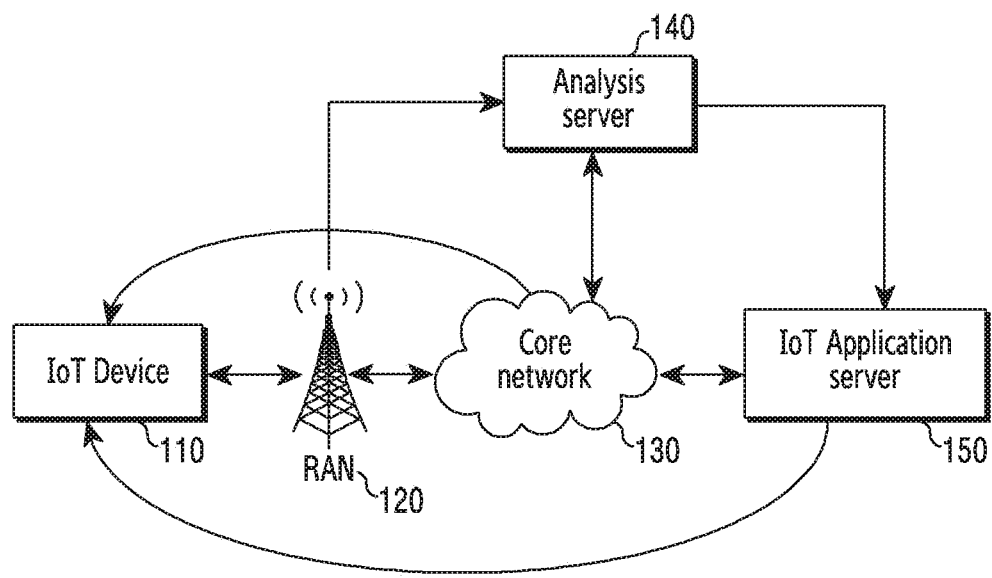
FIG. 1 illustrates an example of a wireless communication system according to various embodiments of the disclosure.

FIG. 1 illustrates an example of a wireless communication system according to various embodiments of the disclosure.

Referring to FIG. 1, the wireless communication system includes an IoT device 110, a radio access network (RAN) 120, a core network 130, an analysis server 140, and an IoT application server 150.

The IoT device 110 is a device for performing machine type communication (MTC), and may be of a type that is not carried by a user. For example, the IoT device 110 may be a light bulb, various sensors, and a device for measuring a water, electricity, gas, or a radio wave. In some embodiments, the IoT device 110 may be a terminal. In this case, the terminal may be a 'user equipment (UE)', 'mobile station', 'subscriber station', 'remote terminal', 'wireless terminal', 'user device', or other terms having the same technical meanings as the above-mentioned terms.

The RAN 120 may denote a network including at least one base station and a base station controller (e.g., a radio network controller (RNC)) for controlling at least one base station. The RAN 120 may provide a connection between the core network 130 and the IoT device 110.

The core network 130 processes data of the IoT device 110, transmitted through an access network (e.g., the RAN 120), so as to enable connection of the IoT device 110 with a device of another access network or connection of the IoT device 110 with another access network, or enable providing of additional services. In some embodiments, the core network 130 may include a mobility management entity (MME) (not shown), a serving general packet radio service support node (SGSN) (not shown), a system architecture evolution-gateway (SAE-GW) (not shown), a general packet radio service support node (GGSN) (not shown), a service capability exposure function (SCEF) (not shown), a machine type communication-inter working function (MTC-IWF) (not shown), and a service capability server (SCS) (not shown).

The analysis server 140 may receive data from the RAN 120, the core network 130, and the IoT application server 150. The analysis server 140 may determine a time duration for minimizing battery consumption by the IoT device 110 using the received data. In addition, the analysis server 140 may determine the remaining battery lifetime of the IoT device 110 using the received data.

The IoT application server 150 may receive information on the IoT device 110 from the IoT device 110. In addition, the IoT application server 150 may transmit or receive service data for the IoT application to or from the IoT device 110. In some embodiments, the IoT application server 150 may transmit information on the battery state of the IoT device 110 to the IoT device 110.

The RAN 120, the core network 130, the analysis server 140, and the IoT application server 150 illustrated in FIG. 1 are described as separate objects. However, at least two or more objects among the RAN 120, the core network 130, the analysis server 140, and the IoT application server 150 may be implemented as one device. For example, two or more objects may be implemented on a general-purpose server using software. Therefore, hereinafter, for the convenience of description, the RAN 120, the core network 130, the analysis server 140, and the IoT application server 150 are described as separate objects, but the disclosure is not limited thereto.

Figure 2:
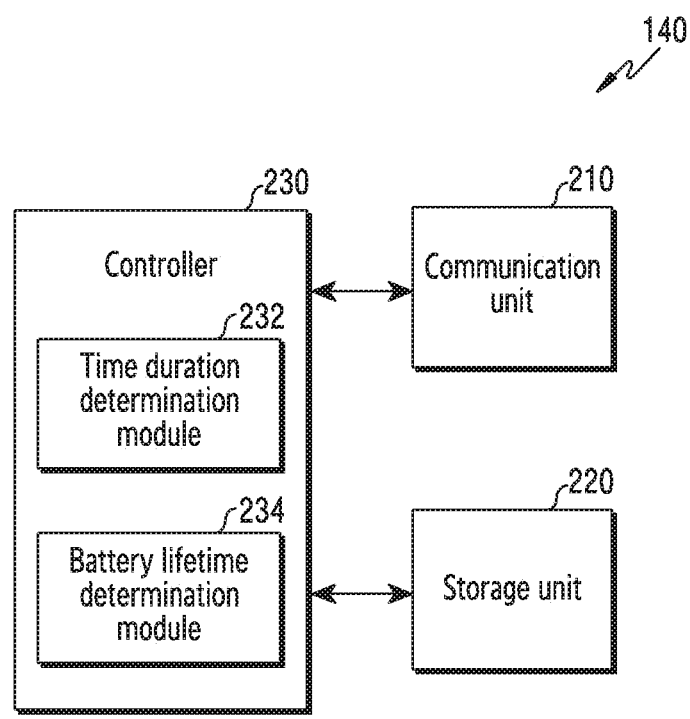
FIG. 2 illustrates an example of a functional configuration of an analysis server in a wireless communication system according to various embodiments of the disclosure.

FIG. 2 illustrates an example of a functional configuration of an analysis server in a wireless communication system according to various embodiments of the disclosure. The configuration exemplified in FIG. 2 may be understood as the configuration of the analysis server 140. The term "~unit" or "~er" used hereinafter may refer to the unit for processing at least one function or operation and may be implemented in hardware, software, or a combination of hardware and software.

Referring to FIG. 2, the analysis server 140 may include a communication unit 210, a storage unit 220, and a controller 230.

The communication unit 210 provides an interface for performing communication with other nodes within the network. That is, the communication unit 210 converts, into a physical signal, a bit string transmitted from the analysis server 140 to another node, for example, another device in the core network 130, the IoT application server 150, and the like, and converts the physical signal received from the other node into the bit string. That is, the communication unit 110 may transmit or receive a signal. Accordingly, the communication unit 210 may also be referred to as a transmission unit, a reception unit, or a transceiver.

The storage unit 220 may store data such as a basic program, an application, and configuration information for the operation of the analysis server 140. The storage unit 220 may be configured as a volatile memory, a non-volatile memory, or a combination of a volatile memory and a non-volatile memory. In addition, the storage unit 220 may provide the stored data in response to a request from the controller 230.

The controller 230 controls the overall operation of the analysis server 140. For example, the controller 230 transmits or receives a signal through the communication unit 210. Further, the controller 230 records data in the storage unit 220 and reads the recorded data. To this end, the controller 230 may include at least one processor. The controller 230 according to various embodiments may include a time duration determination module 232 and a battery lifetime determination module 234. The time duration determination module 232 may determine a time duration for minimizing battery consumption. The battery lifetime determination module 234 may determine the current remaining battery life. Here, each of the time duration determination module 232 and the battery lifetime determination module 234 may be a command set or code stored in the storage unit 220, including a command/code at least temporarily residing in the controller 230, may be a storage space storing the command set or code, or may be a part of a circuit configuring the controller 230. For example, the controller 230 may control the analysis server 140 to perform operations according to various embodiments which will be described later.

FIG. 2 illustrates that the analysis server 140 includes a communication unit 210, a storage unit 220, and a controller 230. However, this is an example, and the analysis server 140 may further include other elements. Some of the communication unit 220, the storage unit 220, and the controller 230 may be omitted.

Figure 3:
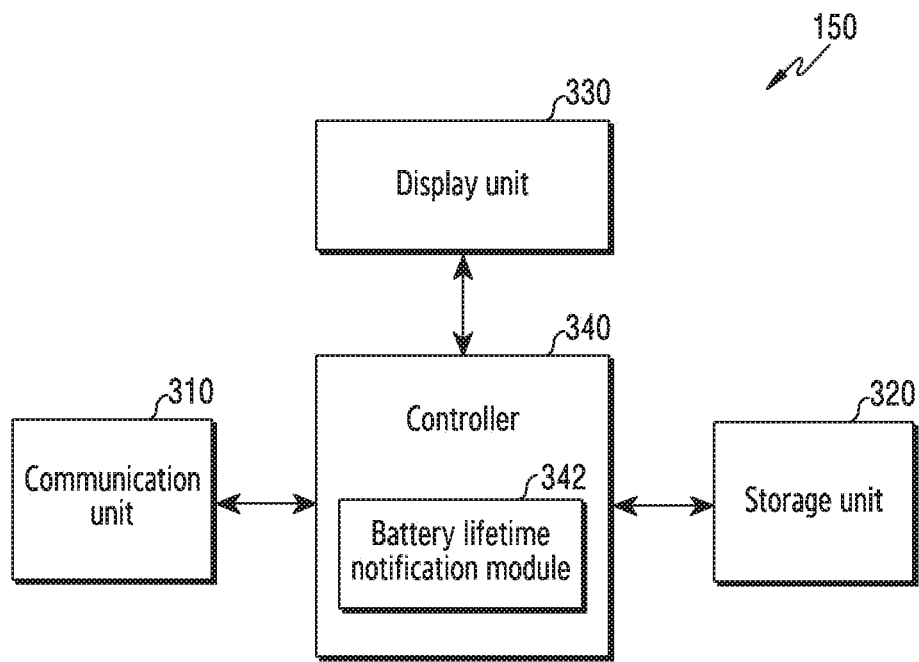
FIG. 3 illustrates an example of a functional configuration of an Internet of Things (IoT) application server in a wireless communication system according to various embodiments of the disclosure.

FIG. 3 illustrates an example of the functional configuration of an IoT application server in a wireless communication system according to various embodiments of the disclosure. The configuration illustrated in FIG. 3 may be understood as the configuration of the IoT application server 150. The term "~unit" or "~er" used hereinafter may refer to a unit for processing at least one function or operation, and may be implemented in hardware, software, or a combination of hardware and software.

Referring to FIG. 3, the IoT application server 150 may include a communicator 310, a storage unit 320, a display unit 330, and a controller 340.

The communication unit 310 performs functions for transmission or reception of a signal through a wireless channel. For example, the communication unit 310 may perform conversion between a baseband signal and a bit string according to a physical layer standard of a system. For example, during data transmission, the communication unit 310 may generate complex symbols by encoding and modulating a transmission bit string. In addition, during data reception, the communication unit 310 may restore a reception bit string by demodulating and decoding a baseband signal. In addition, the communication unit 310 may up-convert the baseband signal to an RF band signal and then transmit the up-converted signal through an antenna, and may down-convert an RF band signal received through the antenna to the baseband signal.

To this end, the communication unit 310 may include a transmission filter, a reception filter, an amplifier, a mixer, an oscillator, a DAC, an ADC, and the like. In addition, the communication unit 310 may include a plurality of transceiving paths. In addition, the communication unit 310 may include at least one antenna array including a plurality of antenna elements. In terms of hardware, the communication unit 310 may include a digital unit and an analog unit, and the analog unit may include a plurality of sub-units according to an operating power, an operating frequency, and the like.

The communication unit 310 may transmit or receive a signal as described above. Accordingly, the communication unit 310 may be referred to as a 'transmission unit', 'reception unit' or 'transceiver'. In addition, in the following description, transmission and reception performed through a wireless channel may be used to mean that the processing described above is performed by the communication unit 310.

The storage unit 320 may store data such as, a basic program, an application, configuration information, and the like for the operation of the IoT application server 150. The storage unit 320 may be configured as a volatile memory, a non-volatile memory, or a combination of a volatile memory and a non-volatile memory. In addition, the storage unit 320 may provide the stored data in response to a request from the controller 340.

The display unit 330 may be a liquid crystal screen, a light-emitting diode display, or another screen capable of displaying text and/or images. The display unit 330 may display a screen corresponding to data received through the controller 340.

The controller 340 controls the overall operation of the IoT application server 150. For example, the controller 340 transmits or receives a signal through the communication unit 310. Further, the controller 340 records data in the storage unit 320 and reads the recorded data. To this end, the controller 340 may include at least one processor. The controller 340 according to various embodiments may include a battery lifetime notification module 332. The battery lifetime notification module 332 may notify the IoT terminal 110 of the current remaining battery life. Here, the battery lifetime notification module 332 may be a command set or code stored in the storage unit 320, including a command/code at least temporarily residing in a controller 340, may be a storage space storing the command set or code, or may be a part of a circuit configuring the controller 340. For example, the controller 340 may control the IoT application server 150 to perform operations according to various embodiments which will be described below.

FIG. 3 illustrates an IoT application server 150 including a communication unit 310, a storage unit 320, a display unit 330, and a controller 340. However, this is exemplary, and the IoT application server 150 may further include other components. Some of the communicator 310, the storage unit 320, the display 330, and the controller 340 may be omitted.

Figure 4:
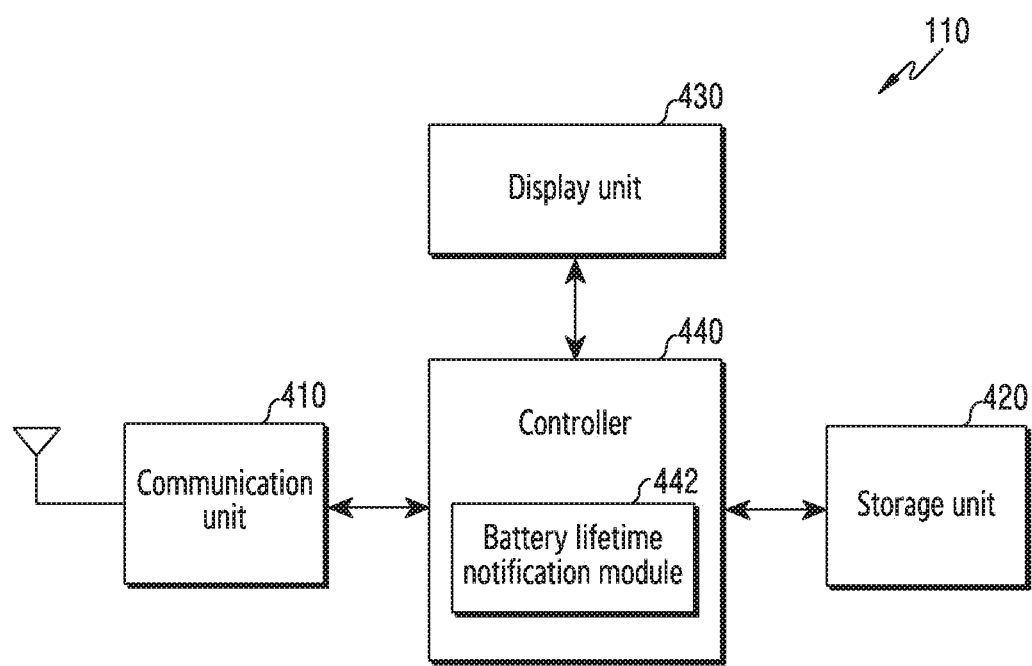
FIG. 4 illustrates an example of a functional configuration of an IoT device in a wireless communication system according to various embodiments of the disclosure.

FIG. 4 illustrates an example of a functional configuration of an IoT device in a wireless communication system according to various embodiments of the disclosure. The configuration illustrated in FIG. 4 may be understood as the configuration of the IoT device 110. The term "~unit" or "~er" used hereinafter may refer to a unit for processing at least one function or operation, and may be implemented in hardware, software, or a combination of hardware and software.

Referring to FIG. 4, the IoT device 110 may include a communicator 410, a storage unit 420, a display unit 430, and a controller 440.

The communication unit 410 may receive an RF signal. To this end, the communication unit 410 may include at least one antenna. The communication unit 410 may perform down-conversion of the received RF signal so as to generate an intermediate frequency (IF) or a baseband signal. The communication unit 410 may include a reception processing circuit that generates a baseband signal which is obtained by performing processing of filtering, decoding, and/or digitizing the baseband or IF signal. The reception processing circuit may transmit the processed baseband signal to a speaker for voice data or transmit the processed baseband signal to the controller 440 for further performing processing thereof (e.g., web browsing data). In addition, the communication unit 410 may include at least one transceiver. The at least one transceiver may receive baseband data (such as web data, e-mail, and interactive video game data) sent (outgoing) from the controller 440. A transmission processing circuit may encode, multiplex, and digitize baseband data for transmission to produce a processed baseband or intermediate frequency signal. The communication unit 410 may up-convert the baseband or intermediate frequency signal, obtained by performing processing for transmission through the transmission processing circuit, into an RF signal that can be transmitted through an antenna.

The storage unit 420 may store data such as a basic program, an application, configuration information, and the like for operation of the device. The storage unit 420 may be configured as a volatile memory, a non-volatile memory, or a combination of a volatile memory and a non-volatile memory. In addition, the storage unit 420 may provide stored data in response to a request from the controller 440.

The display unit 430 may be a liquid crystal screen, a light-emitting diode display, or another screen capable of displaying text and/or images. The display unit 430 may display a screen corresponding to data received through the controller 440.

The controller 440 may control the communication unit 410, the storage unit 420, and the display unit 430, which are functionally coupled to the controller 440. For example, the controller 440 may control the reception of a forward channel signal and the transmission of a reverse channel signal, using the communication unit 410. In some embodiments, the controller 440 may include at least one microprocessor and microcontroller. The controller 440 may execute another process or program existing in a device. The controller 440 may store or retrieve data in or from the storage 420 according to a request from a running process. The controller 440 may be configured to execute an application in response to a received signal based on an operating system. For example, the controller 440 may control the IoT device 110 to perform operations according to various embodiments described below.

FIG. 4 illustrates an IoT device 110 including a communication unit 410, a storage unit 420, a display unit 430, and a controller 230. However, this is an example, and the IoT device 140 may further include other elements. Some of the communication unit 420, the storage unit 420, the display unit 430, and the controller 440 may be omitted.

Figure 5:
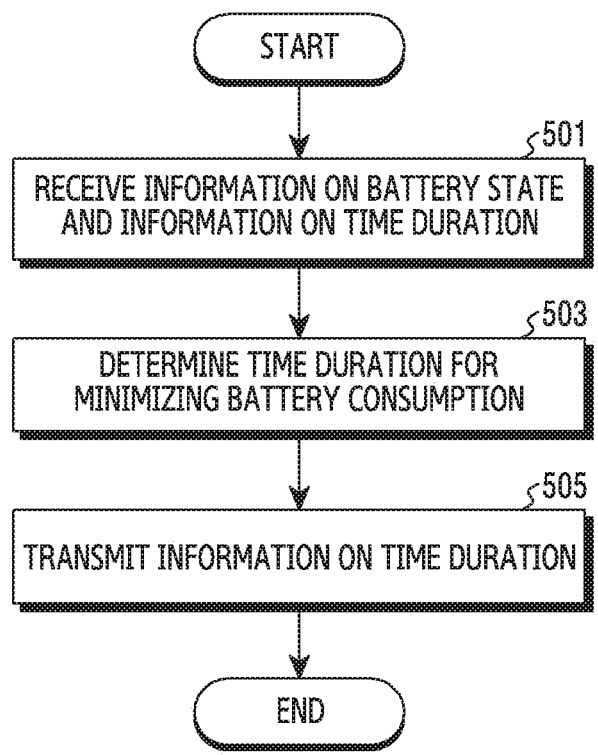
FIG. 5 illustrates an operation method for determination of a time duration for minimizing battery consumption in a wireless communication system according to various embodiments of the disclosure.

FIG. 5 illustrates an operation method for determining a time duration for minimizing battery consumption in a wireless communication system according to various embodiments of the disclosure. The operations exemplified in FIG. 5 may be performed by the analysis server 140.

Referring to FIG. 5, in operation 501, the analysis server 140 receives, from the IoT application server 150, information on a battery state and information on a time duration related to an operation mode of the IoT device 110. The information on the battery state may include the battery consumption amount of the IoT device 110 during a unit time and a remaining battery capacity of the IoT device 110. In some embodiments, the information on the battery state may include the total battery capacity of the IoT device 110. In addition, the information on the time duration related to the operation mode of the IoT device 110 may include information on an active duration, a sleep duration, and a PSM duration. Here, referring to FIG. 6, a unit time duration 601 includes at least one eDRX duration 603. The eDRX duration 603 may include a paging duration 605, a sleep duration 607, a PSM duration 609, and a data duration 611. The paging duration 605 and the data duration 611 may configure an active duration. The data duration 611 may include at least one of a duration for data transmission (not shown) and a duration for data reception (not shown). That is, the unit time duration 601 may be represented by <Equation 1> as follows.

$$D_{unit} = D_{paging} + D_{transmit} + D_{receive} + D_{sleep} + D_{PSM} = N \cdot T_{eDRX} P_{unit\_time}(D_{unit}) = P_{active}(D_{paging}, D_{transmit}, D_{receive}) + P_{sleep}(D_{sleep}) + P_{PSM}(D_{PSM})$$
$$P_{remain} > P_{unit\_time}$$

Equation 1

Here, $D_{unit}$ may denote a unit time duration 601, $D_{paging}$ may denote a paging duration 605, $D_{transmit}$ may denote a duration for data transmission, $D_{receive}$ may denote a duration for data reception, $D_{sleep}$ may denote a sleep duration 607, $D_{PSM}$ may denote a PSM duration 609, N may denote the number of times the IoT device 110 performs paging procedures during the unit time duration 601, $T_{eDR}$ is a eDRX duration 603, $P_{unit\_time}$ may denote a battery consumption amount of the IoT device 110 during the unit time duration 601, $P_{active}$ may denote a battery consumption amount during the paging duration 605, a duration for data transmission, and a duration for data reception. $P_{sleep}$ may denote a battery consumption amount during the sleep duration 607, and $P_{sleep}$ may denote a battery consumption amount during the PSM duration 609. The battery consumption amount may denote a power consumption amount of the IoT device 110. In some embodiments, $P_{active}$, $P_{sleep}$, and $P_{PSM}$ may indicate different values according to IoT devices.

In some embodiments, $P_{active}$ may be a function including $D_{paging}$, $D_{transmit}$, and $D_{receive}$ as parameters. In the case where the IoT device 110 operates in an $n_{th}$ active mode, the analysis server 140 may calculate the power consumption amount of the IoT device 110 according to <Equation 2> defined as follows.

$$P_{active}(D_{paging}[n], D_{transmit}[n], D_{receive}[n]) = \sigma \cdot D_{paging}[n] + \rho \cdot D_{transmit}[n] + \tau \cdot D_{receive}[n]$$

Equation 2

Here, $P_{active}$ may denote a power consumption amount in the case where the IoT device 110 operates in an active mode during the $n_{th}$ unit time duration $D_{unit}[n]$, $D_{paging}[n]$ may denote an $n_{th}$ paging duration, $D_{transmit}[n]$ may denote an $n_{th}$ duration for data transmission, and $D_{recieve}[n]$ may denote an $n_{th}$ duration for data reception. $\sigma$ may denote a power consumption amount of the IoT device 110 per second when the paging procedure is performed, $\rho$ may denote a power consumption by the IoT device 110 per second when data transmission is performed, and τ may denote a power consumption by the IoT device 110 per second when data reception is performed.

In some embodiments, the battery consumption amount during the sleep duration 607 and the battery consumption amount during the PSM duration 609 may correspond to a function which includes as parameters the sleep duration 607 and the PSM duration 609. For example, the battery consumption amount during the sleep duration 607 and the battery consumption amount during the PSM duration 609 may be calculated using <Equation 3> defined as follows.

$$P_{sleep} = \beta \cdot D_{sleep}$$

$$P_{PSM} = \gamma \cdot D_{PSM} \qquad \text{Equation 3}$$

$P_{sleep}$ may denote the battery consumption amount during the sleep duration 607, and $P_{PSM}$ may denote the battery consumption during the PSM duration 609. β denotes the power consumption amount of the IoT device 110 per second when the sleep procedure is performed, and γ denotes the power consumption amount of the IoT device 110 per second when the PSM procedure is performed. In order for the analysis server 140 to calculate the total power consumption amount of the IoT device 110 up to the current time point, past $D_{sleep}$ and $D_{PSM}$ values at the current time point may be transmitted from the core network 130 and the IoT device 110 to the analysis server 140. For future $D_{sleep}$ and $D_{PSM}$, optimized values thereof are determined based on $P_{active}$, and are fed back to the core network 120 and the IoT device 110 from the analysis server 140. In this case, future $D_{sleep}$ and $D_{PSM}$ values may be optimized $D_{sleep}$ and $D_{PSM}$ values for minimizing battery consumption.

Figure 6:
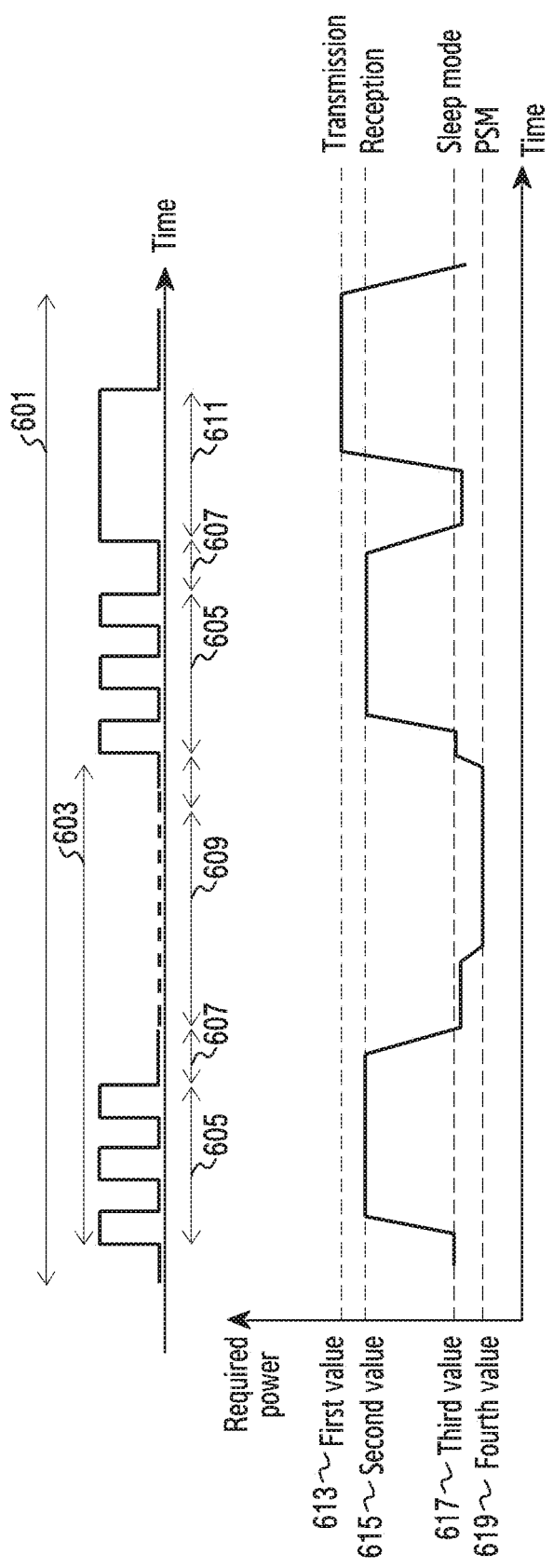
FIG. 6 illustrates an example of required power according to a time duration related to an operation mode of an IoT device in a wireless communication system according to various embodiments of the disclosure.

Further, referring to FIG. 6, the first value 613 may denote the power required by the IoT device 110 for transmission or reception of data during the data duration 611. The second value 615 may denote the power required for reception of a signal during the paging duration 605. For example, the signal received during the paging duration 605 may be a response to the paging signal. The third value 615 may denote the power required by the IoT device 110 for operating in the sleep mode during the sleep duration 607. The fourth value 617 may denote the power required by the IoT device 110 for operating in the PSM mode during the PSM duration 609.

In operation 503, the analysis server 140 determines a time duration for minimizing battery consumption by the IoT device 110. In detail, the analysis server 140 may determine a time duration for minimizing battery consumption based on the information on the battery state and the information on the time duration. In some embodiments, the time duration for minimizing battery consumption may include an optimized eDRX duration and an optimized PSM duration. In this case, the optimized eDRX duration may denote an eDRX duration for minimizing battery consumption, and the optimized PSM duration may denote a PSM duration for minimizing battery consumption. In other embodiments, the time duration for minimizing battery consumption may include an optimized sleep duration and an optimized PSM duration. For example, the optimized sleep duration and the optimized PSM duration may be determined by <Equation 4>, defined as follows.

$$\min_{\{D_{sleep}, D_{PSM}\}} P_{unit\_time}(D_{unit})$$

$$T_{max\_eDRX} > D_{unit}$$

$$D_{unit} = D_{paging} + D_{transmit} + D_{receive} + D_{sleep} + D_{PSM}$$

$$D_{max\_sleep} > D_{sleep}$$

$$D_{max\_PSM} > D_{PSM} \qquad \text{Equation 4}$$

Here, $D_{sleep}$ may denote a sleep duration, $D_{PSM}$ may denote a PSM duration, $D_{unit}$ may denote a unit time duration, $D_{paging}$ may denote a paging duration, $P_{unit\_time}$ may denote a battery consumption amount of the IoT device 110 during the unit time duration $D_{unit}$, $T_{max\_eDRX}$ may denote a maximum value in the eDRX duration that can be maintained by the IoT device 110, $D_{transmit}$ may denote a duration for data transmission, $D_{receive}$ may denote a duration for data reception, $D_{max\_sleep}$ may denote a maximum value in a sleep duration that can be maintained by the IoT device 110, and $D_{max\_PSM}$ may denote a maximum value in a PSM duration that can be maintained by the IoT device 110. For example, $T_{max\_eDRX}$ may be 43.69 minutes, which is the maximum value in the eDRX duration of the IoT device 110 and is defined in the 3rd generation partnership project (3GPP), or the maximum value in the TAU/RAU duration.

In operation 505, the analysis server 140 transmits information on a time duration for minimizing battery consumption by the IoT device 110. In some embodiments, the analysis server 140 may transmit information on the optimized eDRX duration to the core network 130. In addition, the analysis server 140 may transmit information on the optimized PSM duration to the IoT application server 150.

Figure 7:
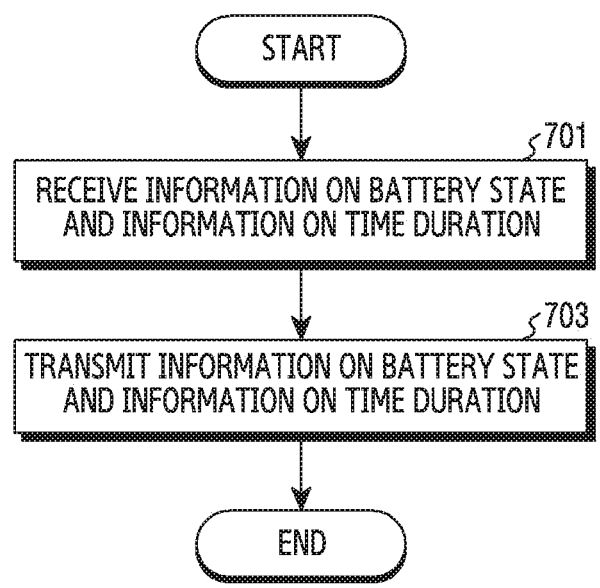
FIG. 7 illustrates an operation method for transmission of information on a battery state and information on a time duration related to an operation mode of an IoT device in a wireless communication system according to various embodiments of the disclosure.

FIG. 7 illustrates an operation method for transmission of information on a battery state and information on a time duration related to an operation mode of an IoT device in a wireless communication system according to various embodiments of the disclosure. The operations exemplified in FIG. 7 may be performed by the IoT application server 150.

Referring to FIG. 7, in operation 701, the IoT application server 150 receives, from the IoT device 110, information on a battery state and information on a time duration related to an operation mode of the IoT device 110. Here, the information on the battery state may include the battery consumption amount $P_{unit\_time}$ of the IoT device 110 during a unit time and the remaining battery capacity $P_{remain}$ of the IoT device 110. In addition, the information on the time duration related to the operation mode of the IoT device 110 may include information on the active duration $D_{active}$, the sleep duration $D_{sleep}$, and the PSM duration $D_{PSM}$.

In operation 703, the IoT application server 150 transmits, to the analysis server 140, information on a battery state and information on a time duration related to an operation mode of the IoT device 110. That is, the IoT application server 150 transmits, to the analysis server 140, the information on the battery state and the information on the time duration related to the operation mode of the IoT device 110, which are received from the IoT device 110.

Figure 8:
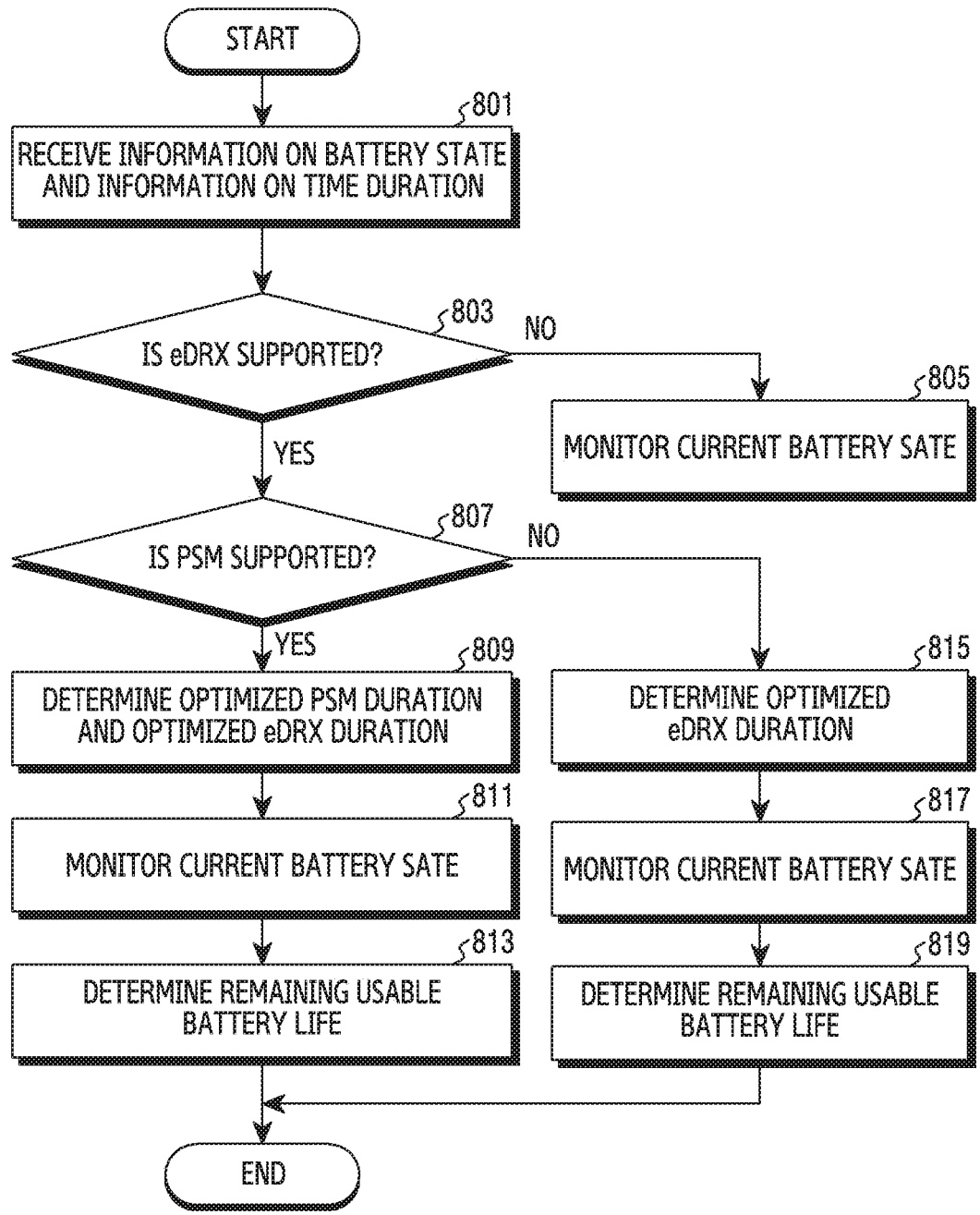
FIG. 8 illustrates an operation method for determining a remaining battery lifetime in a wireless communication system according to various embodiments of the disclosure.

FIG. 8 illustrates an operation method for determination of a remaining battery lifetime in a wireless communication system according to various embodiments of the disclosure. Operations exemplified in FIG. 8 may be performed by the analysis server 140.

Referring to FIG. 8, in operation 801, the analysis server 140 receives, from the IoT application server 150, information on a battery of the IoT device 110 and information on a time duration related to an operation mode of the IoT device 110. Here, the information on the battery state may include the battery consumption amount $P_{unit\_time}$ of the IoT device 110 during a unit time and the remaining battery capacity $P_{remain}$ of the IoT device 110. In addition, the information on the time duration related to the operation mode of the IoT device 110 may include information on the active duration $D_{active}$, the sleep duration $D_{sleep}$, and the PSM duration $D_{PSM}$.

In operation 803, the analysis server 140 determines whether the IoT device 110 supports eDRX. In some embodiments, the analysis server 140 may determine whether the IoT device 110 supports the eDRX based on whether information on the active duration $D_{active}$ and the sleep duration $D_{sleep}$ is received.

If the IoT device 110 does not support the eDRX, in operation 805, the analysis server 140 monitors the current battery state of the IoT device 110. For example, the current battery state of the IoT device 110 may denote a current remaining battery capacity of the IoT device 110. In some embodiments, the analysis server 140 may monitor the current remaining battery capacity of the IoT device 110 by periodically receiving information on the remaining battery capacity of the IoT device 110 from the IoT device 110.

On the other hand, if the IoT device 110 supports the eDRX, in operation 807, the analysis server 140 determines whether the IoT device 110 supports the PSM. In some embodiments, the analysis server 140 may determine whether the IoT device 110 supports the PSM based on whether the PSM duration $D_{PSM}$ is received.

If the IoT device 110 supports the PSM, in operation 809, the analysis server 140 determines an optimized eDRX duration and an optimized PSM duration. In detail, the analysis server 140 may determine an optimized eDRX duration and an optimized PSM duration based on information on a battery of the IoT device 110 and information on a time duration related to an operation mode of the IoT device 110. Here, the optimized eDRX duration may denote an eDRX duration for minimizing battery consumption. In some embodiments, the optimized eDRX duration may be determined based on at least one of device characteristics of the IoT device 110 and the number of times the IoT device 110 has transmitted a signal. The optimized PSM duration may denote a PSM duration for minimizing battery consumption. In some embodiments, the optimized PSM duration may be determined based on at least one of the device characteristics of the IoT device 110 and the number of times the IoT device 110 has transmitted a signal.

In operation 811, the analysis server 140 monitors the current battery state of the IoT device 110. For example, the current battery state of the IoT device 110 may denote the current remaining battery capacity of the IoT device 110. In some embodiments, the analysis server 140 may monitor the current remaining battery capacity of the IoT device 110 by periodically receiving, from the IoT device 110, information on the remaining battery capacity of the IoT device 110.

In operation 813, the analysis server 140 determines a remaining usable battery life of the IoT device 110 using the optimized eDRX duration, the optimized PSM duration, and the current battery state of the IoT device 110. In some embodiments, the analysis server 140 may determine a unit time duration $D_{unit}$ by using the optimized eDRX duration and the optimized PSM duration. In this case, the remaining usable battery life may be determined by <Equation 5> as follows.

$$T_{expected\ battery\ life} = P_{remain}/P_{unit\_time}(D_{unit}) \qquad \text{Equation 5}$$

Here, $T_{expected\ battery\ life}$ may denote the remaining usable battery life of the IoT device 110, $P_{remain}$ may denote the current remaining battery capacity of the IoT device 110, $P_{unit\_time}$ may denote the battery consumption amount of the IoT device 110 during a unit time duration $D_{unit}$, and $D_{unit}$ may denote the unit time duration.

On the other hand, if the IoT device 110 does not support the PSM, in operation 815, the analysis server 140 determines the optimized eDRX duration. That is, the analysis server 140 may include information on an eDRX duration for minimizing battery consumption by the IoT device 110. In some embodiments, the optimized eDRX duration may be determined based on at least one of device characteristics of the IoT device 110 and the number of times the IoT device 110 has transmitted a signal.

In operation 817, the analysis server 140 monitors the current battery state of the IoT device 110. For example, the current battery state of the IoT device 110 may denote the current remaining battery capacity of the IoT device 110. In some embodiments, the analysis server 140 may monitor the current remaining battery capacity of the IoT device 110 by periodically receiving, from the IoT device 110, information on the remaining battery capacity of the IoT device 110.

In operation 819, the analysis server 140 determines a remaining usable battery life of the IoT device 110 by using the optimized eDRX duration. In some embodiments, the analysis server 140 may determine the remaining usable battery life of the IoT device 110 by using the optimized sleep duration included in the optimized eDRX duration.

Figure 9:
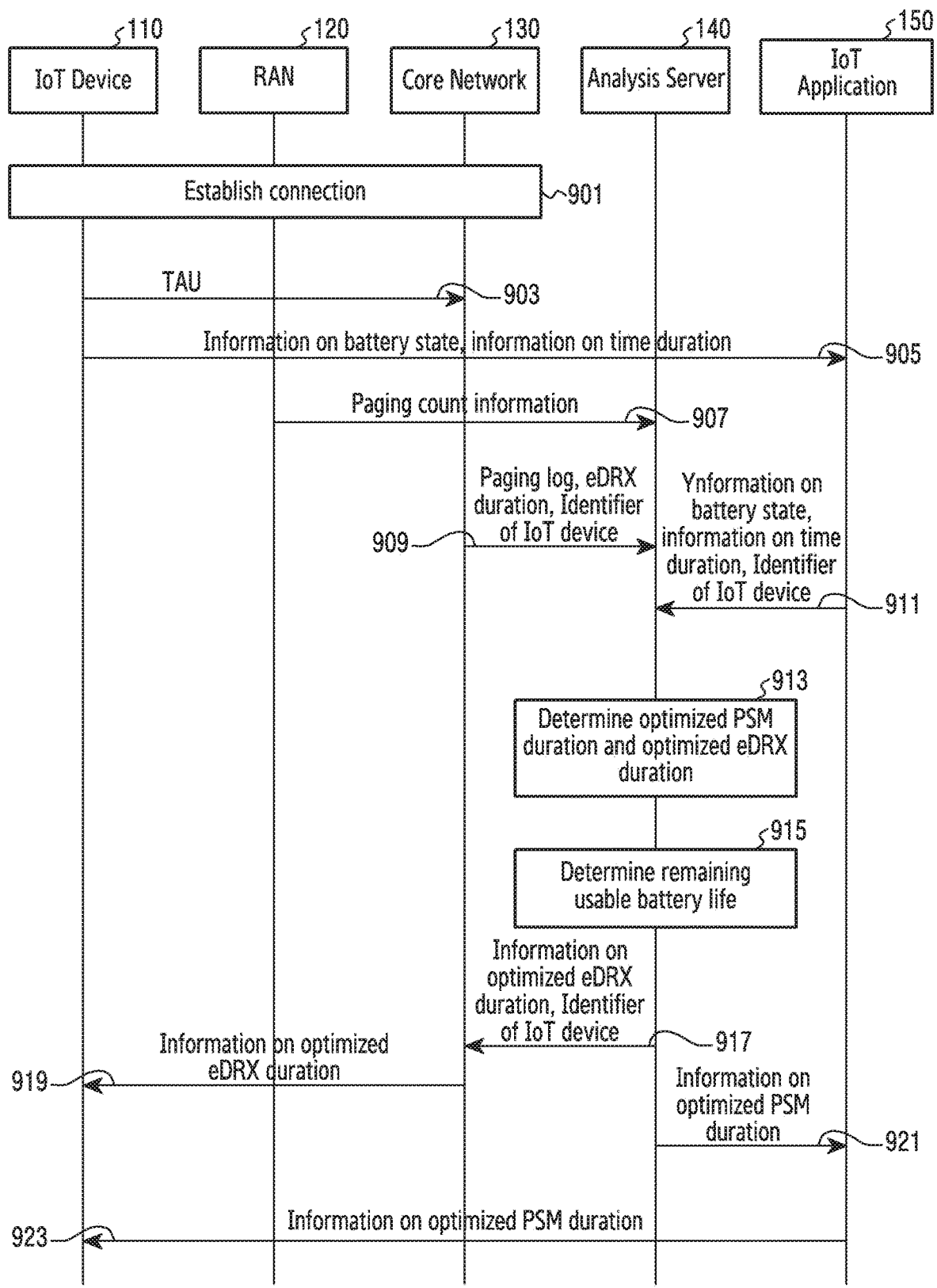
FIG. 9 illustrates a signal exchange for minimizing battery consumption in a wireless communication system according to various embodiments of the disclosure.

FIG. 9 illustrates a signal exchange for minimizing battery consumption in a wireless communication system according to various embodiments of the disclosure.

Referring to FIG. 9, in operation 901, the IoT device 110 may perform initial access to the core network 130 through the RAN 120. For example, the IoT device 110 may perform initial access by transmitting a request message for initial access to the core network 130 through the RAN 120 and then receiving a response message to the request message.

In operation 903, the IoT device 110 performs a tracking area update (TAU) on the core network 130. For example, the IoT device 110 may transmit information on a TA to the core network 130. That is, the IoT device 110 may notify the core network 130 of the location of the IoT device itself with reference to the TA. In some embodiments, the IoT device 110 may perform a routing area update (RAU) on the core network 130.

In operation 905, the IoT device 110 transmits, to the IoT application server 150, information on a battery state of the IoT device 110 and information on a time duration related to an operation mode of the IoT device 110. The information on the battery state may include a battery consumption amount of the IoT device 110 during a unit time and the remaining battery capacity of the IoT device 110. In some embodiments, the information on the battery state may include the total battery capacity of the IoT device 110. In addition, the information on the time duration related to the operation mode of the IoT device 110 may include information on the active duration, the sleep duration, and the PSM duration.

In operation 907, the RAN 120 transmits information on a paging count to the analysis server 140. Here, the paging count information may denote information on the number of times of paging attempts made by the IoT device 110 during a unit time (for example, 1 minute, 5 minutes, 10 minutes, 15 minutes, 30 minutes, or 60 minutes). In some embodiments, the paging count information may be used to control the information on the battery state of the IoT device 110.

In operation 909, the core network 130 transmits, to the analysis server 140, information on a paging log, information on an eDRX duration, and an identifier of the IoT device. Here, the information on the paging log may include information on a time duration in which a paging attempt has been made by the IoT device 110 and information on paging details. For example, the paging details may include information on signals transmitted or received to or from the IoT device 110. In some embodiments, the information on the paging log may be used to control the information on the battery state of the IoT device 110.

In operation 911, the IoT application server 150 transmits, to the analysis server 140, the information on the battery state of the IoT device 110, the information on the time duration related to an operation mode of the IoT device 110, and an identifier of the IoT device 110. That is, the IoT application server 150 transmits, to the analysis server 140, the information on the battery state of the IoT device 110 and information on the time duration related to the operation mode of the IoT device 110, which have been received from the IoT device 110. In some embodiments, the identifier of the IoT device 110 may be an identifier for indicating that the information on the battery state and the information on the time duration related to the operation mode of the IoT device 110, which are transmitted by the IoT application server 150, pertain to the IoT device 110.

In operation 913, the analysis server 140 determines an optimized eDRX duration and an optimized PSM duration. Here, the optimized eDRX duration may denote an eDRX duration for minimizing battery consumption, and the optimized PSM duration may denote a PSM duration for minimizing battery consumption. In detail, the analysis server 140 determines an optimized eDRX duration and an optimized PSM duration based on at least one of information on a battery state of the IoT device 110 and information on a time duration related to an operation mode of the IoT device 110.

In operation 915, the analysis server 140 determines a remaining usable battery life of the IoT device 110. For example, the remaining usable battery life of the IoT device 110 may be determined based on the optimized eDRX duration and the optimized PSM duration.

In operation 917, the analysis server 140 transmits, to the core network 130, information on the optimized eDRX duration and the identifier of the IoT device 110. Since the configuration of the eDRX duration (e.g., the length of the active duration and the length of the sleep duration) is determined by the core network 130, the analysis server 140 may transmit information on the optimized eDRX duration to the core network 130. In some embodiments, the identifier of the IoT device 110 may be an identifier indicating that the information on the optimized eDRX duration pertains to the IoT device 110. In some embodiments, in the case where the analysis server 140 receives, from the RAN 120 and the core network 130, information on the paging duration, information on the duration for data transmission, information on the duration for data reception, information on a sleep duration, and information on a PSM duration, the unit time duration may be configured based on the information on the paging duration, the information on the duration for data transmission, the information on the duration for data reception, the information on the sleep duration, and the information on the PSM duration. In this case, the analysis server 140 may calculate an optimized sleep duration and an optimized PSM duration of a unit time duration and transmit the calculated optimized sleep duration and optimized PSM duration to the core network 130.

In operation 919, the core network 130 transmits information on the optimized eDRX duration to the IoT device 110. That is, the core network 130 applies the optimized eDRX duration to the IoT device 110. Accordingly, the optimized eDRX duration is adaptively applied according to the battery state of the IoT device 110, so that the IoT device 110 may reduce battery consumption.

In operation 921, the analysis server 140 transmits information on the optimized PSM duration to the IoT application server 150. Since the configuration of the PSM duration (e.g., the length of the PSM duration) is determined by the IoT application server 150, the analysis server 140 may transmit information on the optimized PSM duration to the IoT application server 150. In some embodiments, in the case where the analysis server 140 receives, from the RAN 120 and the core network 130, information on the paging duration, information on the duration for data transmission, information on the duration for data reception, information on a sleep duration, and information on a PSM duration, the unit time duration may be configured based on the information on the paging duration, the information on the duration for data transmission, the information on the duration for data reception, the information on the sleep duration, and the information on the PSM duration. In this case, the analysis server 140 may calculate an optimized sleep duration and an optimized PSM duration of the unit time duration and transmit the calculated optimized sleep duration and optimized PSM duration to the IoT device 110.

In operation 923, the IoT application server 150 transmits information on an optimized PSM duration to the IoT device 110. That is, the IoT application server 150 applies the optimized PSM duration to the IoT device 110. Accordingly, the optimized PSM duration is adaptively applied according to the battery state of the IoT device 110, so that the IoT device 110 may reduce battery consumption.

Figure 10:
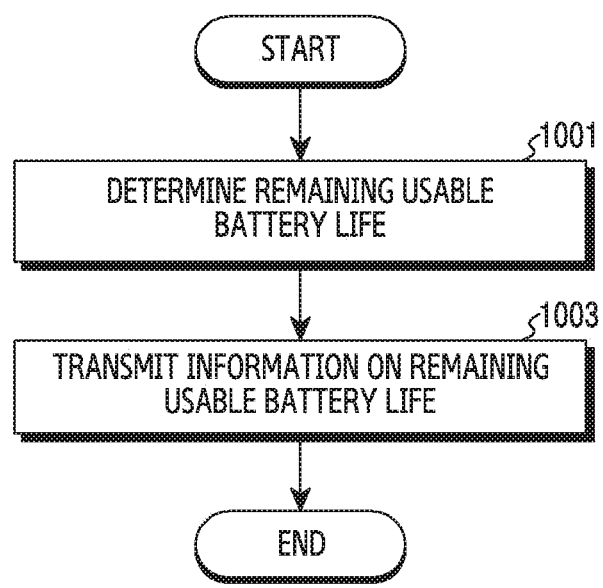
FIG. 10 illustrates an operation method for providing notification of a remaining battery lifetime in a wireless communication system according to various embodiments of the disclosure.

FIG. 10 illustrates an operation method for providing notification of a remaining battery lifetime in a wireless communication system according to various embodiments of the disclosure. The operations exemplified in FIG. 10 may be performed by the analysis server 140.

Referring to FIG. 10, in operation 1001, the analysis server 140 determines a remaining usable battery life of the IoT device 110. In detail, the analysis server 140 determines the remaining usable battery life of the IoT device 110 using the optimized eDRX duration, the optimized PSM duration, and the current battery state of the IoT device 110.

In operation 1003, the analysis server 140 transmits information on the remaining usable battery life of the IoT device 110 to the IoT application server 150. The transmission may be performed for the purpose of displaying the remaining usable battery life of the IoT device 110 by the IoT application server 150.

Figure 11:
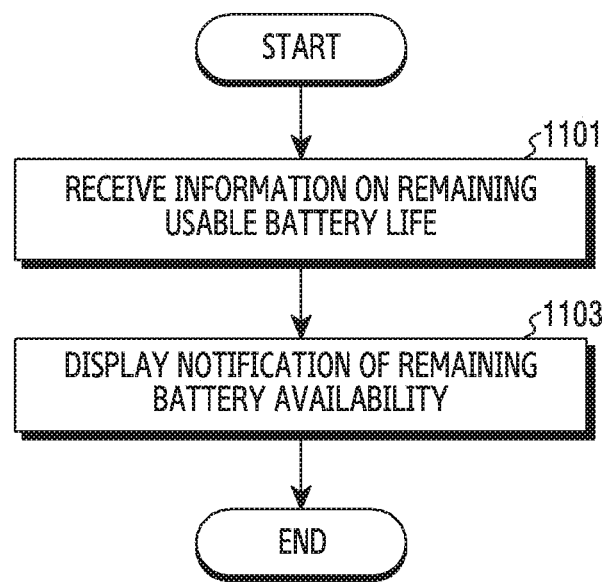
FIG. 11 illustrates an operation method for displaying a remaining battery lifetime in a wireless communication system according to various embodiments of the disclosure.

FIG. 11 illustrates an operation method for displaying a remaining battery lifetime in a wireless communication system according to various embodiments of the disclosure. The operations illustrated in FIG. 11 may be performed by the IoT application server 150 or the IoT device 110.

Referring to FIG. 11, in operation 1101, the IoT application server 150 receives information on the remaining usable battery life of the IoT device 110 from the analysis server 140. The remaining usable battery life of the IoT device 110 may be determined based on an optimized eDRX duration, an optimized PSM duration, and a current battery state of the IoT device 110.

In operation 1103, the IoT application server 150 displays a notification of remaining battery availability of the IoT device 110. In some embodiments, in the case where the IoT application server 150 is an operator or service provider that provides an IoT service, the IoT application server 150 may display the remaining usable battery life of the IoT device 110 on the display of the IoT application server 150. In this case, the IoT application server 150 may be a management device (e.g., a gas meter or a water meter) managed by an operator or service provider itself which provides an IoT service. Accordingly, a user who owns the management device may check the remaining usable battery life of the IoT device 110, displayed on the display of the management device, and replace the battery of the IoT device 110 after the usable battery life has expired.

In other embodiments, in the case where the operation 1103 is performed by the IoT device 110, if the IoT device 110 receives information on the remaining usable battery life of the IoT device 110 from the IoT application server 150, the IoT device 110 may itself display, on the display of the IoT device 110, a notification of remaining battery availability of the IoT device 110. For example, the notification of the remaining battery availability of the IoT device 110 may include the remaining usable battery life of the IoT device 110. Accordingly, the user who owns the IoT device 110 may check the remaining usable battery life of the IoT device 110, displayed on the display of the IoT device 110, and replace the battery of the IoT device 110 after the usable battery life has expired.

Methods according to embodiments stated in claims and/or specifications of the disclosure may be implemented in hardware, software, or a combination of hardware and software.

When the methods are implemented in software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the disclosure as defined by the appended claims and/or disclosed herein.

The programs (software modules or software) may be stored in non-volatile memories including a random access memory and a flash memory, a Read Only Memory (ROM), an Electrically Erasable Programmable Read Only Memory (EEPROM), a magnetic disc storage device, a Compact Disc-ROM (CD-ROM), Digital Versatile Discs (DVDs), or other type optical storage devices, or a magnetic cassette. Alternatively, any combination of some or all thereof may form a memory in which the program is stored. Further, a plurality of such memory devices may be included in the electronic device.

In addition, the programs may be stored in an attachable storage device which may access the electronic device through communication networks such as the Internet, Intranet, Local Area Network (LAN), Wide LAN (WLAN), and Storage Area Network (SAN) or a combination thereof. Such a storage device may access the electronic device for performing embodiments of the disclosure via an external port. Further, a separate storage device on the communication network may access a portable electronic device.

In the above-described detailed embodiments of the disclosure, a component included in the disclosure is expressed in the singular or the plural according to the presented detailed embodiment. However, the singular form or plural form is selected for convenience of description suitable for the presented situation, and various embodiments of the disclosure are not limited to a single element or multiple elements thereof. Further, either multiple elements expressed in the description may be configured into a single element or a single element in the description may be configured as multiple elements.

While the disclosure has been shown and described with reference to certain embodiments thereof, it will be understood by those skilled in the art that various changes in form and details may be made therein without departing from the scope of the disclosure. Therefore, the scope of the disclosure should not be defined as being limited to the embodiments, but should be defined by the appended claims and equivalents thereof.

The invention claimed is:

1. A method performed by a server in a wireless communication system, the method comprising:
    receiving, from an electronic device via an application server, first information on a battery state of the electronic device and second information on a time duration related to an operation mode of the electronic device;
    receiving, from a core network entity, information on a previous extended discontinuous reception (eDRX) duration and an identifier of the electronic device;
    determining an eDRX duration for the electronic device based on the information on the previous eDRX duration, the first information and the second information; and
    transmitting, to the core network entity, information on the eDRX duration,
    wherein the time duration related to the operation mode of the electronic device includes an active mode duration, a sleep mode duration, and a power saving mode (PSM) duration.

2. The method of claim 1, further comprising:
    determining a usable battery life of the electronic device based on the eDRX duration; and
    transmitting information on the usable battery life of the electronic device to the electronic device via the application server.

3. The method of claim 1, wherein the first information on the battery state of the electronic device includes information on a battery consumption amount in a unit time, a current battery capacity, and a total battery capacity of the electronic device.

4. The method of claim 1, further comprising:
    receiving, the second information on a time duration related to an operation mode of the electronic device including a previous power saving mode (PSM) duration;
    determining a PSM duration for the electronic device based on the first information and the second information; and
    transmitting, to the electronic device via the application server, information on the PSM duration.

5. The method of claim 4, further comprising:
    determining whether the electronic device supports the eDRX based on receiving the second information; and
    determining whether the electronic device supports the PSM based on receiving the previous PSM duration in response to receiving the previous eDRX duration.

6. The method of claim 1, further comprising:
    receiving, from a base station, information on a paging count which is the number of times of paging attempts in a unit time; and
    receiving, from the core network entity, information on a paging log,
    wherein the first information on the battery state of the electronic device is controlled based on the information on the paging count and the information on the paging log.

7. A server device in a wireless communication system, the server device comprising:
    a transceiver; and
    at least one processor configured to:
        receive, from an electronic device via an application server, first information on a battery state of the electronic device and second information on a time duration related to an operation mode of the electronic devices, receive, from a core network entity, information on a previous extended discontinuous reception (eDRX) duration and an identifier of the electronic device, determine an eDRX duration for the electronic device based on the information on the previous eDRX duration, the first information and the second information, and transmit, to the core network entity, information on the eDRX duration, wherein the time duration related to the operation mode of the electronic device includes an active mode duration, a sleep mode duration, and a power saving mode (PSM) duration.

8. The server device of claim 7, wherein the at least one processor is further configured to:

determine a usable battery life of the electronic device based on the eDRX duration; and transmit information on the usable battery life of the electronic device to the electronic device via the application server.

9. The server device of claim 7, wherein the first information on the battery state of the electronic device includes information on a battery consumption amount in a unit time, a current battery capacity, and a total battery capacity of the electronic device.

10. The server device of claim 7, wherein the at least one processor is further configured to:

receive, the second information on a time duration related to an operation mode of the electronic device including a previous power saving mode (PSM) duration;

determine a PSM duration for the electronic device based on the first information and the second information; and transmit, to the electronic device via the application server, information on the PSM duration.

11. The server device of claim 10, wherein the at least one processor is further configured to:

determine whether the electronic device supports the eDRX based on receiving the second information; and determine whether the electronic device supports the PSM based on receiving the previous PSM duration in response to the receiving the previous eDRX duration.

12. The server device of claim 7, wherein the at least one processor is further configured to:

receive, from a base station, information on a paging count which is the number of times of paging attempts in a unit time; and receive, from the core network entity, information on a paging log, wherein the first information on the battery state of the electronic device is controlled based on the information on the paging count and the information on the paging log.

* * * * *